US011112798B2

(12) United States Patent
Egner

(10) Patent No.: US 11,112,798 B2
(45) Date of Patent: Sep. 7, 2021

(54) METHODS AND APPARATUS FOR REGULATING A POSITION OF A DRONE

(71) Applicant: Axon Enterprise, Inc., Scottsdale, AZ (US)

(72) Inventor: Will A. Egner, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 307 days.

(21) Appl. No.: 16/388,324

(22) Filed: Apr. 18, 2019

(65) Prior Publication Data

US 2019/0324460 A1  Oct. 24, 2019

Related U.S. Application Data

(60) Provisional application No. 62/659,822, filed on Apr. 19, 2018.

(51) Int. Cl.
*G05D 1/00*     (2006.01)
*B64C 39/02*    (2006.01)
(Continued)

(52) U.S. Cl.
CPC ......... *G05D 1/0094* (2013.01); *B64C 39/024* (2013.01); *G05D 1/042* (2013.01);
(Continued)

(58) Field of Classification Search
CPC ............... G05D 1/0094; G05D 1/042; G05D 2201/0209; B64C 39/024;
(Continued)

(56) References Cited

U.S. PATENT DOCUMENTS 9,471,059 B1    10/2016  Wilkins
9,563,201 B1 *   2/2017  Tofte .................... G05D 1/0038
(Continued)

FOREIGN PATENT DOCUMENTS

| WO | 201480388 A2 | 5/2014 |
| WO | 2014080388 A2 | 5/2014 |
| WO | 2017223531 A1 | 12/2017 |
| WO | 2018022021 A1 | 2/2018 |

*Primary Examiner* — Richard M Camby
(74) *Attorney, Agent, or Firm* — Letham Law Firm LLC

(57) ABSTRACT

A drone autonomously operates to track an object and/or observe the details of an object while maintaining communication at a rate equal to or greater than a threshold. A drone may operate to maintain the image of an object at or above a predetermined resolution in an image captured by a camera mounted on the drone and to maintain a wireless communication rate equal to or greater than a threshold rate. The object resolution may be a function of the position of the drone relative to the object. The position of the drone may include the altitude of the drone. The communication rate may be a function of the position of the drone relative to one or more base stations. The position of the drone relative to the object and to the base stations may be a function of altitude. A drone may autonomously move to capture an image of an object at an object resolution and maintain wireless communication at or above a threshold. A drone may operate in one or more modes while moving to accomplish the objectives of object resolution and communication data rate.

20 Claims, 4 Drawing Sheets

(51) Int. Cl.
  *G06K 9/00* (2006.01)
  *G05D 1/04* (2006.01)
  *G06T 7/70* (2017.01)

(52) U.S. Cl.
  CPC ....... *G06K 9/0063* (2013.01); *G06K 9/00771* (2013.01); *G06T 7/70* (2017.01); *B64C 2201/127* (2013.01); *B64C 2201/141* (2013.01); *G05D 2201/0209* (2013.01); *G06T 2207/30196* (2013.01)

(58) Field of Classification Search
  CPC ........ B64C 2201/127; B64C 2201/141; G06T 7/70; G06T 2207/30196; G06K 9/0063; G06K 9/00771
  See application file for complete search history.

(56) References Cited

U.S. PATENT DOCUMENTS

| | | | |
|---|---|---|---|
| 9,609,288 B1* | 3/2017 | Richman | B64C 39/024 |
| 9,930,298 B2* | 3/2018 | Bevirt | G05D 1/0094 |
| 9,989,965 B2 | 6/2018 | Cuban et al. | |
| 10,642,271 B1* | 5/2020 | Graber | G02B 15/16 |
| 2010/0013917 A1* | 1/2010 | Hanna | G08B 13/19608 |
| | | | 348/143 |
| 2013/0200207 A1* | 8/2013 | Pongratz | B64C 37/02 |
| | | | 244/2 |
| 2018/0075759 A1 | 3/2018 | Kim et al. | |

* cited by examiner

METHODS AND APPARATUS FOR REGULATING A POSITION OF A DRONE

FIELD OF THE INVENTION

Embodiments of the present invention relate to drones.

BRIEF DESCRIPTION OF THE DRAWING

Embodiments of the present invention will be described with reference to the drawing, wherein like designations denote like elements, and.

DETAILED DESCRIPTION OF THE PREFERRED EMBODIMENTS

Figure 1:
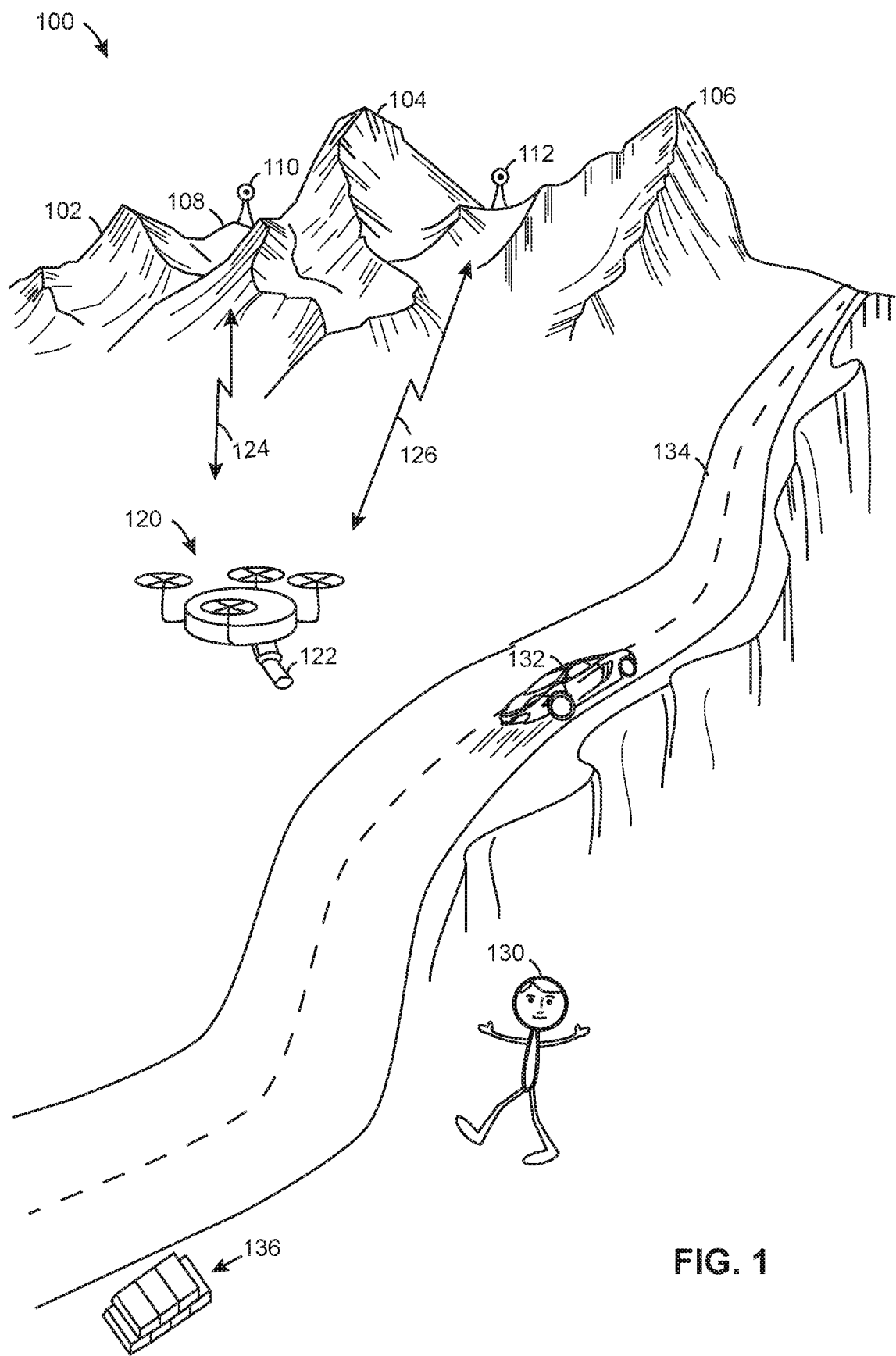
FIG. 1 is a view situation in which a drone tracks and/or observes an object according to various aspects of the present disclosure.

Unmanned aerial vehicles (e.g., drones) are used in many situations such as photography, oil exploration, disaster relief, and product delivery. Security agencies (e.g., police, fire, private) may use drones to perform surveillance. A drone may be used by security personnel (e.g., officers, agents, police officers) to surveil the position, activities, and movements of a suspect. A drone may carry a camera (e.g., still, video) to surveil a suspect. Data from the camera may be used to aid autonomous movement of the drone.

A drone may also be used to establish and/or improve communication. A drone may be positioned to establish or improve communication between officers. Officers may use communication devices (e.g., radios, smart phones) to communicate with each other. The communication devices may use any communication protocol. A drone may function as a communication hub. For example, a done may perform the function of a WiFi access point to enable communication between officers. A drone may be used to extend cell phone range to enable communication between officers. Communication devices carried or used by officers may establish wireless communication with the drone. The drone may relay communications from one officer to another. The drone may position itself so that all officers, or some, may communicate with the drone and therefore with each other.

A drone may establish or improve communication between officers and a server or between the drone and a server. A drone may communicate with a server via a network. For example, a drone may establish wireless communication with one or more base stations of a network (e.g., cellular 3G, LTE, 5G). The drone may communicate wirelessly with a base station. The base station may communicate with a server via one or more other networks. A drone may communicate (e.g., transmit, receive) data via the wireless connection with a base station. Data transmitted by a drone may originate in the drone (e.g., photographic data, video data, audio data, GPS data, drone status data). Data communicated by a drone may be received from or transmitted to a communication device used by an officer.

A drone may move, in three dimensions (e.g., x, y, z; latitude, longitude, altitude), to establish and/or improve communication with a base station. A drone may move to avoid an object that lies in the line-of-sight between the drone and a base station. A drone may move to a position, in three-dimensions, where there are no obstructions between the drone and the base station thereby establishing communication and/or improving communication between the drone and the base station.

A server that receives data from or transmits data to a drone may be located in an office (e.g., headquarters) of a security agency. The data transmitted by the drone and received by the server may include streaming video captured by a video camera on the drone.

A drone may also receive data from a server. Data transmitted by a server and received by a drone may include map data, a suspect's identity, a vehicle owner, and/or instructions to officers.

A drone may receive instructions (e.g., commands) from a server via a base station that control (e.g., manipulate, alter, instruct) the flight (e.g., movement in three dimensions) of the drone. A drone may receive, either exclusively or in addition to commands from a server, flight instructions from a remote control operated by an officer near the location of the drone. Using a remote control, an officer may control all aspects (e.g., geographic position, altitude, roll, pitch, yaw, camera on, camera off, communication on, communication off) of the operation of a drone. Some aspects of the flight of a drone may be automated so that the drone may control all or a portion of its movements without user intervention. For example, an officer may provide a drone a command (e.g., identify suspect, stealth mode, tracking mode, observation mode) and the drone may control its flight in accordance with the command.

A drone may use a camera mounted on the drone to identify objects. A drone may provide video data (e.g., still images, motion images) to an officer. An officer may use the video data captured by the camera of the drone to select an object for tracking and/or observation. An object may include a human suspect, a vehicle, and/or crime related paraphernalia (e.g., pile of money, drugs, guns, stolen licorice). A drone may autonomously (e.g., automatically), with no user intervention, or mostly autonomously, with only some user intervention, track an identified object. A drone may autonomously or mostly autonomously observe an object.

Tracking an object includes capturing video data of the object at a resolution that enables identifying (e.g., finding) the object in video data (e.g., a video image, frame of video), and moving along with (e.g., tracking, following, shadowing) the object as the object moves. Tracking an object means that the object remains identifiable in subsequent video data (e.g., object does not move out of camera range, object does not become unidentifiable, subsequent frames of video data).

While tracking an object, the camera on the drone must capture images of the object with a resolution (e.g., number of pixels) sufficient to identify the object. The term object resolutions means the resolution of an object in an image. The minimum number of pixels, or minimum object resolution, needed to identify an object for tracking is referred herein as the surveillance resolution.

Object resolution may be expressed as a fixed number of pixels (e.g., 1000, 10000) or a portion (e.g., percentage) of the total number of pixels captured by the image sensor. For example, surveillance resolution may be expressed as 1000 pixels. In this example, if the object is represented by 1000 pixels in an image, the resolution of the object is sufficient to identify the object. Since the object may be identified, it may be identified in subsequent images captured by the camera and therefore tracked (surveilled). In another example, the surveillance resolution is expressed as 1% of the total number of pixels of an image (e.g., number of pixels of the sensor that captured the image). For this example, if an object is represented by 1% of the pixels of the total number of pixels of an image, the object resolution is sufficient to identify the object and therefore track the object.

While observing an object, the camera on the drone must capture an image of the object, or a portion of the object, with a resolution sufficient to identify visual details (e.g., license plate, weapon type, serial number, eye color, facial expression, facial features, finger print, tattoo) of the object. The minimum number of pixels needed to identify visual details of the object is referred herein as the observation resolution.

As with the tracking resolution, the minimum number of pixels for identifying visual details of an object may be expressed as a fixed number of pixels (e.g., 107520, 8.4 megapixels) or a portion (e.g., percentage) of the total number of pixels of an image. For example, observation resolution may be 107520 pixels. In this example, if the object is represented by 107520 pixels in an image, or the sensor, the resolution of the object is sufficient to identify visual details of the object. In another example, the observation resolution is 35% of the total number of pixels of an image (e.g., sensor). For this example, if the object is represented by 35% of the pixels of the total number of pixels of an image, the resolution is sufficient to identify visual details of the object.

The number of pixels needed to identify an object in a video image depends on many factors including the type sensor that captures the image, the area of the sensor, the sensitivity of the sensor, the number of pixels in the sensor (e.g., 640×480, 1600×1200, 6016×4016), pixel size, the shape of the object, the size of the object, the luminosity of the object, atmospheric light, and time of exposure.

The surveillance resolution and/or observation resolution for one sensor may be different from the surveillance resolution and/or observation resolution for another sensor. For example, a sensor with 640×480 pixels may need to capture an object with 10,000 pixels, which is 3.3% of the total pixels, to be able to identify the object for tracking. In another example, a sensor with 6016×4016 pixels may need to capture an object with 241,602 pixels, which is 1% of the total pixels, to be able to identify the object for tracking. The number of pixels needed for tracking an object may also vary with atmospheric conditions (e.g., light, smoke, haze). As photographic conditions deteriorate, the number of pixels needed to identify and track an object may increase. For example, when there is a thin haze in the air, a sensor with 640×480 pixels may need to use between 10% and 15% of the total pixels to capture the object for tracking. In the same conditions, a sensor with 6016×4016 pixels may need to use between 3% and 5% of the total pixels to capture the object for tracking.

A similar situation exists for the observation resolution with respect to different sensors and atmospheric conditions. For example, a sensor with 640×480 pixels may need to capture an object with 55% of the total pixels to be able to identify the visual details of the object. In another example, a sensor with 6016×4016 pixels may need to capture an object with 35% of the total pixels to be able to identify the visual details of the object. The number of pixels needed for observing an object may also vary with atmospheric conditions (e.g., light, smoke, haze); however, because the camera likely will need to be physically closer to an object to capture visual details rather than identify the object for tracking, the effect of the atmosphere on the number of pixels needed for the observation resolution may have less of an effect. However, movement of the object may increase the number of pixels that need to be captured to identify visual features of the object.

Generally, for a given sensor under the same atmospheric conditions, the observation resolution is greater than the surveillance resolution.

A drone may track or observe more than one object at a time. One or more objects may be identified for tracking and/or observing in any manner. As long the image of each object is captured with at least the surveillance resolution or the observation resolution, two or more objects may be tracked and/or observed by a drone at the same time. However, if the objects move apart from each other, so that the number of pixels of each object in the image decreases to below the surveillance resolution or the observation resolution, then the drone must cease tracking at least some of the objects to continue tracking a subset, possibly just one, of the objects.

Determining which objects to cease tracking and which objects to continue tracking may be accomplished in any manner. For example, if an officer selects objects for tracking, the officer may priorities the objects. If all selected objects cannot be tracked and/or observed at the same time, the drone ceases tracking and/or observing lower priority objects first. The drone ceases to track and/or observe lower priority objects until the surveillance resolution and/or observation resolution may be met for the remaining objects.

A drone may move, autonomously or partially autonomously, to track (e.g., surveil, follow) or observe an object while communicating. However, changes in position (e.g., one dimensional, two dimensional, three dimensional) to track and/or observe may affect communication. A predetermined rate of communicating data between a drone and a server may be needed to track and/or observer an object. Movement of the drone to track and/or observe an object may decrease the rate of communication below a desired threshold. Movement of a drone to increase the rate of communication may affect the ability of the drone to track and/or observe (e.g., captures images of object with minimum object resolution). A drone, according to various aspects of the present disclosure, may autonomously (e.g., automatically), without human intervention, control its position to find a balance between surveillance/observation and communication.

Data communication rates may be measured in bits per second or bytes per second. The following abbreviations for data rates, used herein, are: kbps, kBps, Mbps, and MBps for kilo bits per second, kilo Bytes per second, megabits per second, and megabytes per second respectively. As used herein, the term byte is eight bits.

In an implementation, a threshold for communication may be the rate at which a drone may transmit video as captured by the camera in real-time (e.g., live streaming, streaming). In an implementation, the rate of communication for live-streaming video is at least 5 Mbps. The threshold communication rate for a drone to transmit live-streaming video to a server is referred to herein as the live-stream threshold. In an implementation, a threshold for communication may be the rate at which a drone may send one or more still images at the beginning of an incident or at various times during an incident. An incident may include a situation in which officers of a security agency track or observer suspects of a crime. A data rate for transmission of occasional high resolution still images from the drone to a server may range from 1 Mbps to 2.4 Mbps at various times and 284 kbps to 1 Mbps for receiving information from the server.

Autonomous flight for a drone, according to various aspects of the present disclosure, includes fighting in accordance with a tracking mode, an observation mode, and a stealth mode while attempting to meet communication criteria. A mode of flight may be specified (e.g., selected, commanded) by a user of a drone. A user may determine whether a drone should track an object, observe an object, or operate in accordance with a stealth mode. Once a user has selected a mode of flight (e.g., operation), the drone may autonomously control its flight (e.g., movement in three dimensions) to fulfill (e.g., meet) the criteria of the mode and the requirements for communication.

In the tracking mode, as discussed above, a drone moves to track (e.g., follow) the movements of the object while maintaining the object resolution in the images from the camera at or above the surveillance resolution. As further discussed above, the surveillance resolution depends on the sensor used by the camera to capture images. The drone further positions itself to communicate at a rate that is at or above a threshold, for example at or above the live-stream threshold. In the tracking mode, the drone may communicate with a server via base stations in the area where the drone operates. In other words, in the tracking mode, the drone may track the movements of the object, maintains the surveillance resolution of the object in the images from the camera, and communicate with a server at a communication rate.

In the observation mode, as discussed above, a drone moves to observe visual details of an object while maintaining the object resolution in the images from the camera at or above the observation resolution. As the object moves, the drone tracks the movements of the object to maintain the observation resolution of the object in the images from the camera. As further discussed above, the observation resolution depends on the sensor used by the camera to capture images. The drone further positions itself to communicate at a rate that is at or above a threshold. In the observation mode, the drone may communicate with a server via base stations in the area where the drone operates. Images with visual details are transmitted to a server for possible analysis and/or identification. The result of analysis and/or identification may be reported to the drone and/or an officer at the incident where the drone is operating. The result of analysis and/or identification may be communicated to the officer via the drone. In other words, in the observation mode, the drone may track the movements of the object, maintains the observation resolution of the object in the images from the camera, and communicate with a server at a communication rate.

In the stealth mode, as with the tracking mode, a drone moves to track (e.g., follow) the movements of the object while maintaining the object resolution in the images from the camera at or slightly above the surveillance resolution. In the stealth mode, the drone stays as far away from the object as possible while maintaining the object resolution in the camera images at or near the surveillance resolution. In the tracking mode, the object resolution in an image must be at least the surveillance resolution. The drone may move close to the object thereby exceeding the surveillance resolution of the object, possibly significantly, as long as the communication rate is maintained. In the stealth mode, the drone moves close enough to the object to maintain the resolution of the object in the image at or slightly above the surveillance resolution to reduce the likelihood that people on the ground, including a suspect that is being tracked, will notice the drone. Keeping the drone farther away (e.g., distance may include lateral distance and altitude) from the object reduces the visual profile of the drone and the sound of the drone at the ground.

In the event that the drone cannot meet the object resolution (e.g., surveillance resolution, observation resolution) and communication rate requirements at the same time, a choice may be made between maintaining object resolution or communication. In an implementation, tracking and/or observing the object is given a higher priority than maintaining the rate of communication above a threshold. In the event that the rate of communication drops to zero while tracking and/or observing, the video data captured by the camera of the drone is stored in a memory in the drone for later transfer. In the event that the rate of communication is less than the threshold, but greater than zero, the drone may transmit some video data while storing the remainder for later transfer. When the communication rate is restored to a rate above the threshold, the drone may transmit video data from the point when communication was lost or reduce or it may retain stored data for later transmission and transmit currently captured data.

In another implementation, maintaining a communication rate greater than a threshold is given a higher priority than image resolution. In this scenario, the drone moves to maintain communication at or above a threshold while attempting to keep the object resolution in the image at or above the minimum for the mode of operation.

Situation 100 of FIG. 1 may be used to provide examples of the operation of a drone in accordance with the above modes while communicating. Situation 100 occurs in the area where in an incident is in progress. Police officers received a tip that suspect 130 would attempt to retrieve pile of money 136. The officers sent drone 120 to surveil the situation. The position of the officers is not show in FIG. 1.

Pile of money 136 and suspect 130 are positioned in a valley at the base of mountains 102, 104, and 106. Base stations 110 and 112 include a tower upon which one or more directional antennas are respectively situated; however, the antennas are oriented to provide coverage to adjacent valleys. Base station 110 and/or 112 provide some coverage to the valley where suspect 130 is positioned. Drone 120 may wirelessly communicate with base station 110 and/or 112 but only while drone 120 is positioned within a range of altitudes. At various positions and/or altitudes, drone 120 will not be able to wirelessly communicate with base stations 110 and 112 because wireless signals 124 and 126 are blocked by terrain and cannot reach base stations 110 or 112. In situation 100, as drone 120 increases its altitude, the rate of communication between drone 120 and base stations 110 and 112 increases, up to a point.

After launching drone 120, the officers put drone 120 into the stealth mode so that they can track suspect 130 without alerting suspect 130 of their presence. The officers, in any suitable manner, identify suspect 130 as the primary target for tracking and vehicle 132 as the secondary target for tracking. Because drone 120 is operating in the stealth mode, it stays the greatest possible distance away from suspect 130 and vehicle 132 while still capturing the images of both suspect 130 and vehicle 132 at the surveillance resolution for the camera and while communicating with base station 110 and/or 112 at or above a threshold rate.

Before drone 120 starts tracking suspect 130 and vehicle 132, it identifies the altitudes at which it can communicate at or above a threshold (e.g., predetermined, livestream) rate. For this example, assume that the officers want to stream the video captured by camera 122 to headquarters in real-time (e.g., live-streaming). Further assume that the minimum communication rate for live streaming is 5 Mbps. In this example communication threshold 210 is 5 Mbps.

Before starting tracking, drone 120 characterizes the altitudes in the valley, or at least a portion thereof, at which the communication rate supported by base station 110 and/or 112 is at least the threshold rate. As mentioned above, the landscape (e.g., mountain 102, maintain 104, depth of valley at base of mountains 102 and 104) does not permit base station 110 and/or 112 to provide communication at the threshold rate, or possible at any rate, at all locations (e.g., three-dimensional locations).

Figure 2:
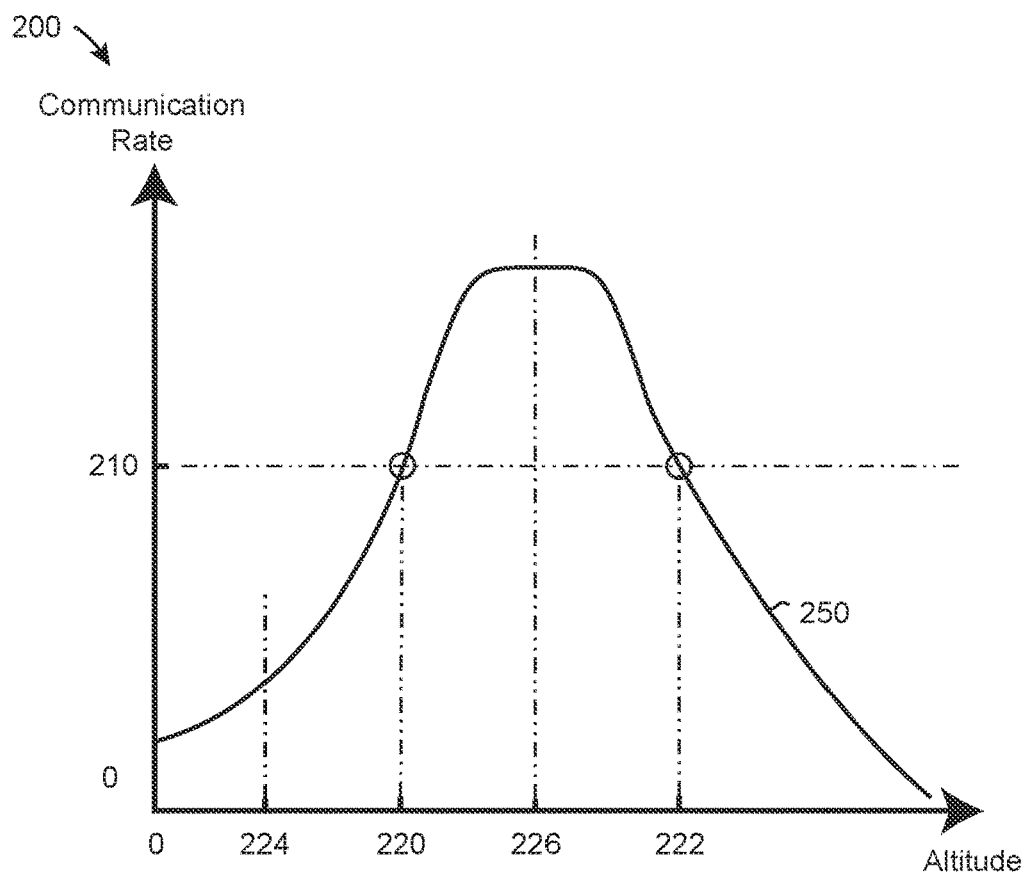
FIG. 2 is a graph of communication rate and altitude.

Graph 200 in FIG. 2 represents communication rates at various altitudes in situation 100. To characterize the communication in the valley, drone 120 ascends from the bottom of the valley, which is altitude 224. As drone 120 ascends it attempts to establish communication with base station 110 and/or 112. Once communication is established, drone 120 (e.g., communication circuit 760, processing circuit 720) measures the communication rate. Drone 120 records its position and communication rates as it ascends and measures the communication rates.

Graph 200 shows that at altitude 224 at the geographic position (e.g., x, y; latitude, longitude, northing, easting) where the drone is launched, drone 120 may communicate with base station 110 and/or 112, but at a rate that is below threshold 210. When drone ascends to altitude 220, drone 120 detects that it can communicate at a rate that is at threshold 210. As drone 120 continues to communicate with base station 110 and/or 112 at a rate that exceeds rate 210 as it ascends to altitude 222. At altitude 226, drone 120 notes that the rate of communication with base station 110 and/or 112 is at a maximum for that geographic position.

As drone 120 ascends above altitude 222, the rate of communication with base stations 110 and/or 112 decreases below threshold rate 210. The reduction in the communication rate above altitude 222 may be due to the fact that antennas on cell phone towers are generally directional antennas that are oriented toward the ground. Above altitude 222, the communication rate with base station 110 and/or 112 is less than the threshold 210.

Because in this example, the communication rate of drone 120 with base station 110 and/or 112 needs to be greater than threshold 210, drone 120 will need to fly, if possible, at least in this vicinity of the geographic location where it has just measured, between altitude 220 and altitude 222.

Figure 3:
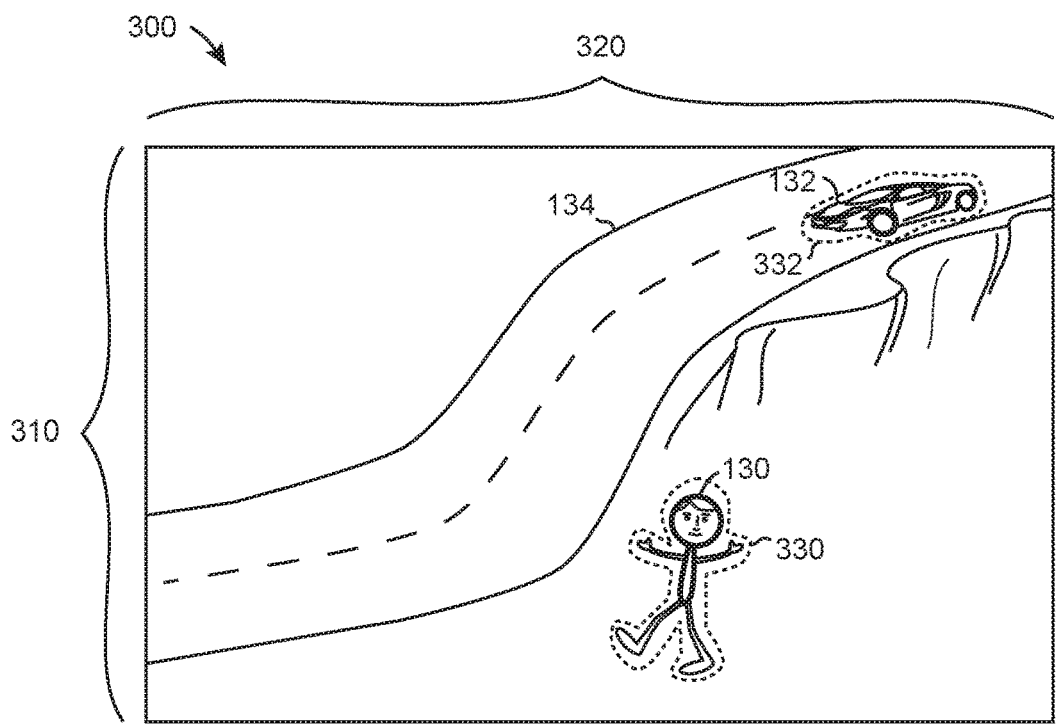
FIGS. 3-5 are diagrams of objects in images captured by a camera.

As drone 120 begins tracking, drone 120 ascends to altitude 226 and a distance away from suspect 130, so its communication rate is greater than threshold 210 while capturing images of suspect 130 and vehicle 132 at the surveillance resolution. Image 300 of FIG. 3 captures images of both suspect 130 and vehicle 132. Camera 122 captures images that have height 310 and width 320. The image of suspect 130 and vehicle 132 are represented by object resolution 330 and object resolution 332 respectively. The number of pixels in object resolution 330 and object resolution 332 are each greater than the surveillance resolution.

For example, assume that height 310 and width 320 of image 300 are 4016 pixels and 6016 pixels respectively. The total number of pixels in image 300 is 24,160,256 (e.g., 24.2 mega pixels). Assume for this sensor, that the surveillance resolution is at least 1% of the total number of pixels in an image. For suspect 130 to be represented in image 300 at the surveillance resolution, object resolution 330 is at least 1% of 24.2 megapixels, so the number of pixels in object resolution 330 is at least 241,602 pixels. The same applies for vehicle 132. Object resolution 332 is at least 241,602 pixels.

Figure 4:
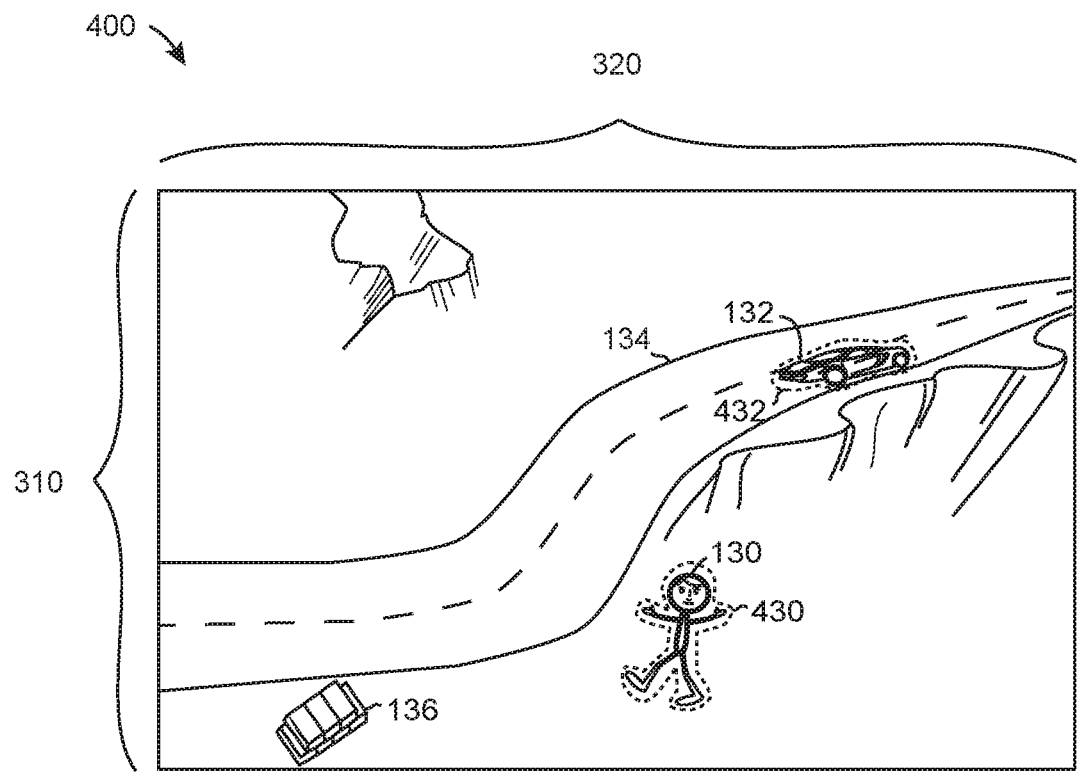

Because vehicle 132 is moving along road 134, camera 122 must continually zoom out, or move farther away, to keep both suspect 130 and vehicle 132 in the image. After a while, referring to FIG. 4, object resolution 430 that represent suspect 130 and object resolution 432 that represent vehicle 132 in image 400 both drop below the surveillance resolution. At this point, drone 120 cannot meet the required criteria of the stealth mode because it cannot maintain the surveillance resolution of all objects being tracked. Drone 120 autonomously moves closer to suspect 130 and vehicle 132 to try to maintain the surveillance resolution of each object in the image. However, because of the increasing distance between suspect 130 and vehicle 132, drone 120 soon determines that it cannot track both objects at the same time. Because suspect 130 has a higher priority than vehicle 132, drone 120 ceases to track vehicle 132 and tracks only suspect 130. Drone 120 autonomously moves to a position to maintain the greatest distance between itself and suspect 130 while capturing images of suspect 130 at the surveillance resolution and while communicating at a rate that is equal to or greater than threshold 210.

At some point, the officer is convinced that suspect 130 is aware of the presence of drone 120, so the stealth mode is no long needed. The office instructs drone 120 to operate in the tracking mode. In the tracking mode, drone 120 autonomously moves to maintain suspect 130 in the image at any resolution that is equal to or greater than the surveillance resolution, while maintaining the communication rate equal to or greater than threshold 210. In the tracking mode, the resolution of suspect 130 in an image may be significantly greater than the surveillance resolution because drone 120 is no longer attempting to conceal its presence.

As drone 120 moves to track suspect 130, drone 120 moves with respect to mountains 102 and 104. At some geographic positions (e.g., x, y; latitude, longitude) and altitudes, mountains 102 and 104 will block wireless communication signals (e.g., communication channels) 124 and 126 so that drone 120 cannot communicate with base station 110 and 112. At some positions in the valley, drone 120 may be able to communicate with base station 110 or 112, but not be able track suspect 130. At other positions, drone may be able to track suspect 130 and communicate with base station 110 and/or 112, but the rate of communication of data (e.g., speed of transfer) may be less than threshold 210.

Drone 120 autonomously maneuvers in three dimensions to try to meet the requirements for a mode. In the tracking mode or stealth mode, drone 120 tracks suspect 130, maintains the communication rate at or greater than threshold 210, and maintains the object resolution of suspect 130 in the image at or above the surveillance resolution. In the observation mode, drone 120 observes suspect 130, maintains the communication rate at or greater than threshold 210, and maintains the object resolution of suspect 130 in the image at or above the observation resolution.

In an implementation, when drone 120 cannot meet all the criteria of a mode, drone 120 prioritizes image capture at the object resolution of the mode (e.g., surveillance resolution, observation resolution) over communication. In the event that the drone 120 moves to a position where the communication rate decreases below the threshold, drone 120 continues to capture video information at the resolution for the mode while tracking or observing suspect 130. In the event that the resolution of suspect 130 in the image decrease (e.g., suspect 130 moves quickly) below the needed resolution (e.g., surveillance resolution, observation resolution), drone 120 moves to maintain the resolution of suspect 130 in the image even if it has to move to a position where the communication rate drops below threshold 210.

At some point during situation 100, the officer determines that the identity of suspect 130 needs to be confirmed, so the officer instructs drone 120 to operate in the observation mode. As drone 120 moves from the stealth mode or tracking mode to the observation mode, drone 120 realizes that the object resolution of suspect 130 in an image does not meet the observation resolution. As a result, drone 120 moves in three dimensions to get closer to suspect 130 so that suspect 130 in the image is at or above the observation resolution.

Figure 5:
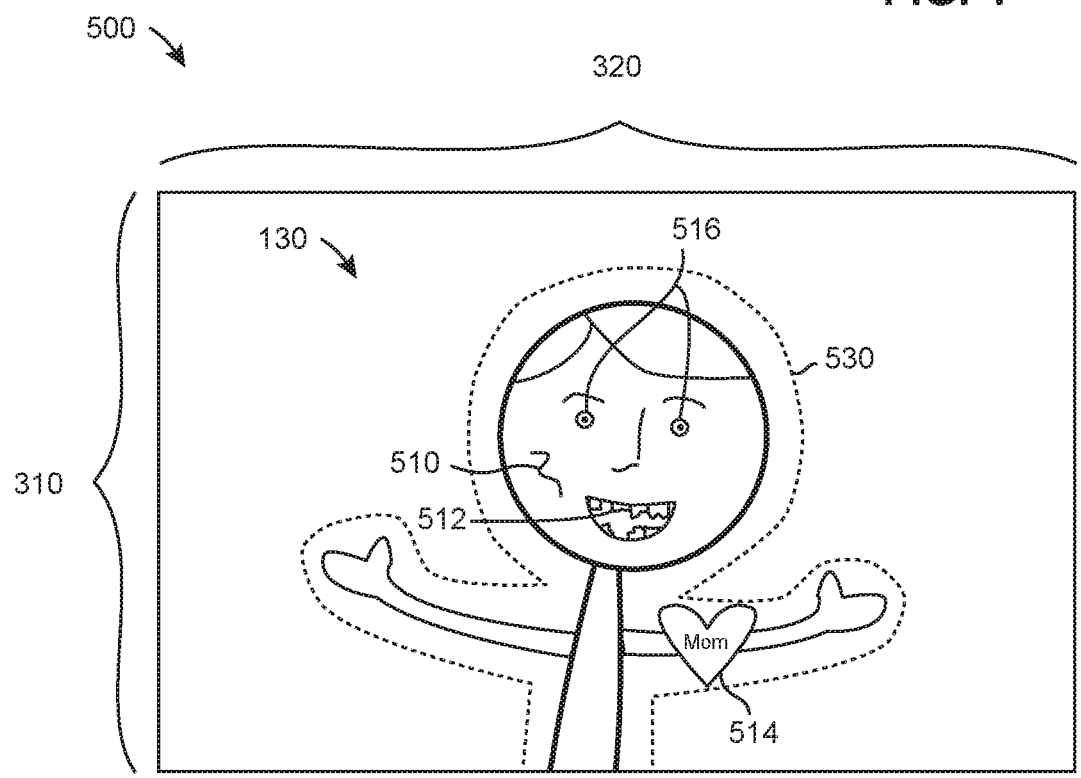

Image 500 of FIG. 5 shows an image of suspect 130 at or above the observation resolution. Image 500, as with images 300 and 400, have height 310 and width 320. The image of suspect 130 is represented by object resolution 530. Object resolution 530 is at or greater than the observation resolution. The number of pixels that represent suspect 130 in object resolution 530 is greater than the number of pixels that represent suspect 130 object resolution 330 or object resolution 430. The number of pixels in object resolution 530 is sufficient to show visual details of suspect 130 that were not visible at lower object resolutions. In this case, the resolution of suspect 130 in image 500 permits identification of eye color 516, scar 510, irregular teeth, and tattoo 514. The visual details captured in the observation mode provide information for verifying the identity of suspect 130.

Identifying suspect 130 may be accomplished by comparing the visual details captured in the observation mode to a database of images of people.

For example, assume that height 310 and width 320 of image 500 are 4016 pixels and 6016 pixels respectively. The total number of pixels in image 500, as determined above, is 24.2 mega pixels. Assume for this sensor, that the observation resolution is at least 35% of the total number of pixels in an image. For suspect 130 to be represented in image 500 at the observation resolution, object resolution 530 is at least 35% of 24.2 megapixels, so the number of pixels in object resolution 330 is at least 8,456,089 pixels (e.g., 8.5 mega pixels).

Images captured where an object has only the surveillance resolution number of pixels do not provide sufficient object resolution to provide identifying details of the object. Drone 120 may move closer to an object and/or may change (e.g., adjust) the zoom factor of camera 122 to increase the number of pixels that represent the object from the surveillance resolution to the observation resolution. When drone 120 moves closer to an object to observe the object, drone 120 may move below an altitude where drone 120 can communicate with base station 110 and/or 112 at a rate that is at least threshold 210. In some situations, it is important to be able to transmit a live steam of the video data captured by camera 122, so it is important to maintain communication rate 250 above threshold 210 and the number of pixels that represent the object at least above the surveillance resolution. At times it is important to keep communication rate 250 above threshold 210 while capturing images of the object with at least the observation resolution number of pixels.

A drone, according to various aspects of the present invention, may autonomously move to capture images of an object with at least a minimum amount of pixels (e.g., observation resolution, surveillance resolution) while maintaining a communication rate at or above a threshold rate for communication.

Figure 6:
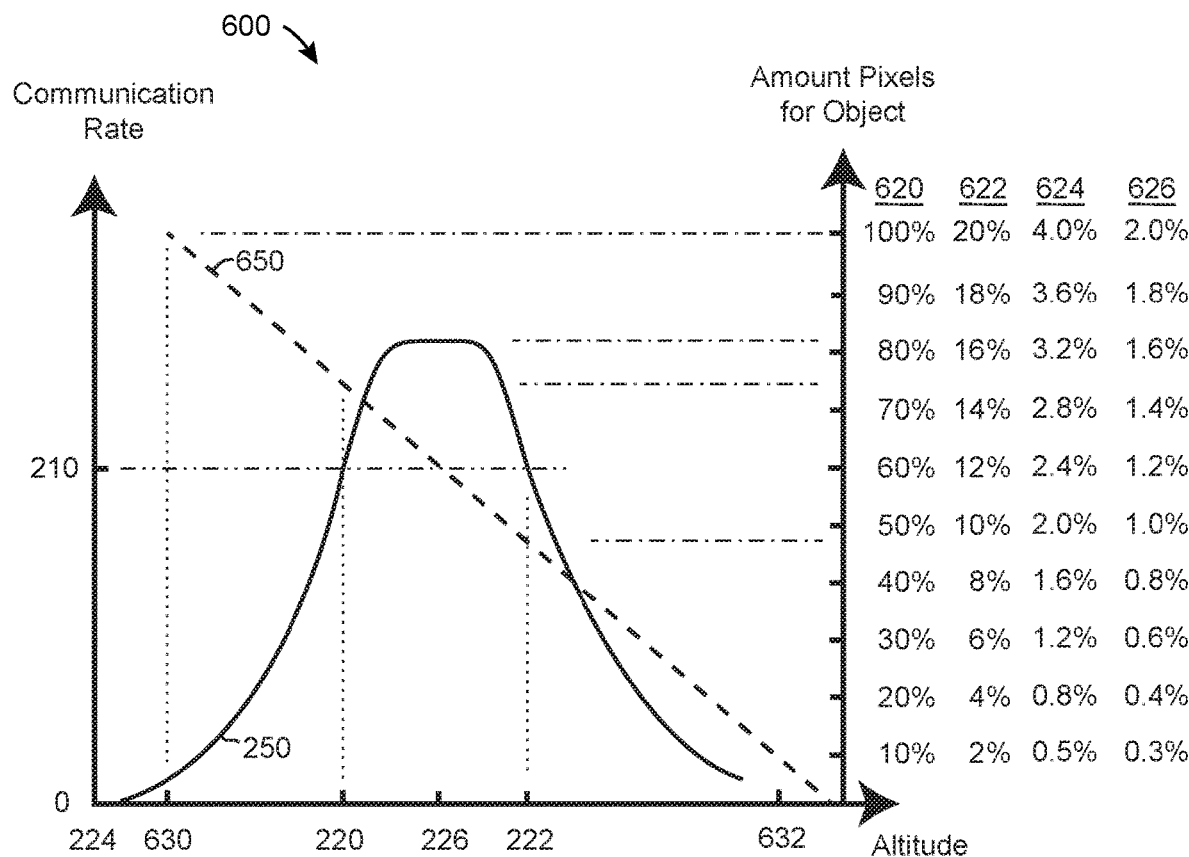
FIG. 6 is the graph of FIG. 2 overlaid with object resolution in an image for various zoom factors of a camera.

The graph of communication rate from FIG. 2 is repeated in FIG. 6 and is overlaid with information regarding the object resolution in an image to form graph 600. As in FIG. 2, the altitude in FIG. 6 represents the altitude of drone 120. Line 650 represents the amount (e.g., number) of pixels that represent the object (e.g., object resolution) in an image for a given altitude. With respect to the amount of pixel for an object, altitude in this graph may represent a distance between drone 120 and the object.

Graph 600 includes zoom factors 620, 622, 624, and 626. At zoom factor 620, as drone 120 rises from the valley floor, altitude 224, the image of the object (e.g., suspect 130) decreases in size in the image captured by camera 122. When drone 120 reaches altitude 630, the image of the object completely fills the sensor of camera 122, so the object resolution at altitude 630 for zoom factor 620 is 100%. While still at altitude 630, switching to zoom factor 622 reduces the object resolution to 20% of the total pixels of the image captured by camera 122. While still at altitude 630, switching to zoom factor 624 reduces the object resolution to 4% of the total pixels of the image. While drone 120 is still positioned at altitude 630, switching to zoom factor 626 reduces the object resolution to 2% of the total pixels of the captured image.

As drone 120 operates in a mode (e.g., stealth, tracking, observation), it attempts to position itself between altitude 220 and 222, so it can communicate at a rate that is equal to or greater than threshold 210. While between those altitudes, drone 120 may adjust the zoom of camera 122 to attempt to meet the object resolution criteria (e.g., surveillance minimum, observation minimum). For example, at zoom factor 620, the resolution of the object in the image is between 75%, at altitude 220, and 48%, at altitude 222. Using zoom factor 620, enables drone 120 to meet the requirement of communication at a rate equal to or greater than threshold 210 and object resolution requirement for the observation mode and the tracking mode for the 24.2 mega pixel camera example discussed above. At zoom factor 620, drone 120 does not meet the object resolution requirement of being at or close to the surveillance resolution for the stealth mode.

At zoom factor 622, while drone 120 is between altitude 220 and 222, drone 120 may communicate at a rate equal to or greater than threshold 210 and maintain an object resolution of between 15% and 9.6%. Again, for the example 24.2 mega pixel camera, zoom factor 622 enables drone 120 to meet requirements for the tracking mode. The object resolution at zoom factor 622 for this range of altitudes is too small for observation mode and is too great for the stealth mode.

At zoom factor 624, while drone 120 is between altitude 220 and 222, drone 120 may communicate at a rate equal to or greater than threshold 210 and maintain an object resolution of between 3.0% and 1.92%. Again, for the example 24.2 mega pixel camera, zoom factor 624 enables drone 120 to meet requirements for the tracking mode. The object resolution at zoom factor 624 for the range of altitudes is too small for observation mode. The object resolution is close to the surveillance resolution and may be close enough to the surveillance resolution for the stealth mode.

At zoom factor 626, while drone 120 is between altitude 220 and 222, drone 120 may communicate at a rate equal to or greater than threshold 210 and maintain an object resolution of between 1.5% and 0.96%. Again, for the example 24.2 mega pixel camera, zoom factor 626 enables drone 120 to meet requirements for the tracking mode and for the stealth mode. The object resolution at zoom factor 626 for the range of altitudes is too small for the observation mode.

If drone 120 were in the stealth mode, camera 122 could be set to use zoom factor 626 and drone 120 could hoover just below altitude 222, which provides communication rate greater than threshold 210, object resolution, and greatest distance.

Drone 120 moves, in three dimensions and adjusts the zoom factor of camera 122 to achieve the communication rate and object resolution for the current mode of operation. As discussed above, the video data capture requirement (e.g., resolution of the object in the image) may have priority over communication. However, it is also possible to prioritize maintaining the communication rate over video capture. In the event that communication above a threshold were prioritized, drone 120 could adjust the zoom of camera 122 to capture video of the object at the best possible object resolution possible at the altitudes required for communication above the threshold.

The balance between communication and object resolution may be expressed as Boolean equations for each mode of operation. If the result of the Boolean equation is True, the drone meets the criteria for the mode. The Boolean equations for the various modes are provided below. The symbol ">~" means: approximately equal to, but not less than. The symbol "~" means approximately equal to.

$$\text{Observation mode} = (\text{communication rate} \geq \text{communication threshold}) \& (\text{object resolution} \geq \text{observation minimum}). \quad \text{Equation 1}$$

$$\text{Tracking mode} = (\text{communication rate} \geq \text{communication threshold}) \& (\text{object resolution} \geq \text{surveillance minimum}). \quad \text{Equation 2}$$

$$\text{Stealth mode} = (\text{communication rate} \geq \text{communication threshold}) \& (\text{object resolution} >\sim \text{surveillance minimum}). \quad \text{Equation 3}$$

When observation mode, tracking mode, and stealth mode for formulas 1-3 respectively are True, the communication and object resolution requirements for that particular mode are met; otherwise, the requirements have not been met.

Numerical formulas for the various modes may be developed that provide information for balancing communication rate and object resolution. Boolean formulas do not provide information as an amount that the communicate rate exceeds the communication threshold, only that it does or does not exceed. Numerical formulas show when either the communication rate or the object resolution exceeds needed thresholds. Numerical formulas for the various modes are provide below.

$$\text{Observation mode} = (\text{communication rate}/\text{communication threshold}) * (\text{object resolution}/\text{observation minimum}). \text{ The preferred value is } \geq 1. \quad \text{Equation 4:}$$

$$\text{Tracking mode} = (\text{communication rate}/\text{communication threshold}) * (\text{object resolution}/\text{surveillance minimum}). \text{ The preferred value is } \geq 1. \quad \text{Equation 5:}$$

$$\text{Stealth mode} = (\text{communication rate}/\text{communication threshold}) * (\text{object resolution}/\text{surveillance minimum}). \text{ The preferred value is } >\sim 1. \quad \text{Equation 6:}$$

For the observation mode and tracking mode, equations 4 and 5 respectively, when the value of the equation is equal to 1, the requirements for that mode are met. To the extend that the value of the equation exceeds 1, the communication rate and/or object resolution exceed the requirement. Having information regarding the amount the communication rate and/or object resolution exceed the requirement enables the drone to move in three dimensions to reduce the communication and/or the object resolution, if needed, to operate in the mode.

For example, assume that the observation mode that the communication threshold is 5 Mbps and the observation minimum is 60%. Further assume that the present communication rate is 5.3 Mbps and the present object resolution is 55%. For the above values, the value of observation mode, equation 4, is 0.97, which means that the requirements of the observation mode are not met. However, because the value of the present communication rate is greater than the communication threshold, so that (communication rate/communication threshold)=1.06, the drone knows that it can descend in altitude, thereby sacrificing the communication rate to increase the object resolution. Drone may maneuver (e.g., move) in three dimensions to reduce the communication rate ratio in an attempt to increase the object resolution ratio so that the value of equation 4 is greater than or equal to one.

A drone may move in three-dimensions until the value of equations 4 and 5 are greater than or equal to one. A drone may further change the zoom factor of the camera of the drone to aid in achieving a value that is greater than or equal to one.

For the stealth mode, equation 6, as with equations 4 and 5, when the value of equation 6 is equal to 1, then the communication requirement and the object resolution requirement has been met. However, in the stealth mode, the drone wants to be positioned at the furthest distance away from the object as possible while meeting the requirements. Both the communication rate and the object resolution are related to the distance (e.g., altitude) the drone is positioned away from the object. So, in the stealth mode, the drone may sacrifice communicate rate and object resolution for distance (e.g., altitude) between the drone and the object. In the stealth mode, the drone may position itself so that the value of equation 6 is at least one and not more than one. With respect to the stealth mode, the phrase "not more than one" may be construed to mean that the value of equation 6 should be in the range of 1 to 3.0, preferably in the range of 1 to 2.

As with equations 4 and 5, a drone may move in three-dimensions and/or change the zoom factor of the camera until the value of equation 6 is greater than 1, but much more than one. When referring to the stealth mode, when the object resolution is about the surveillance resolution, the value of equation 6 lines in the range of 1 to 3.0.

Figure 7:
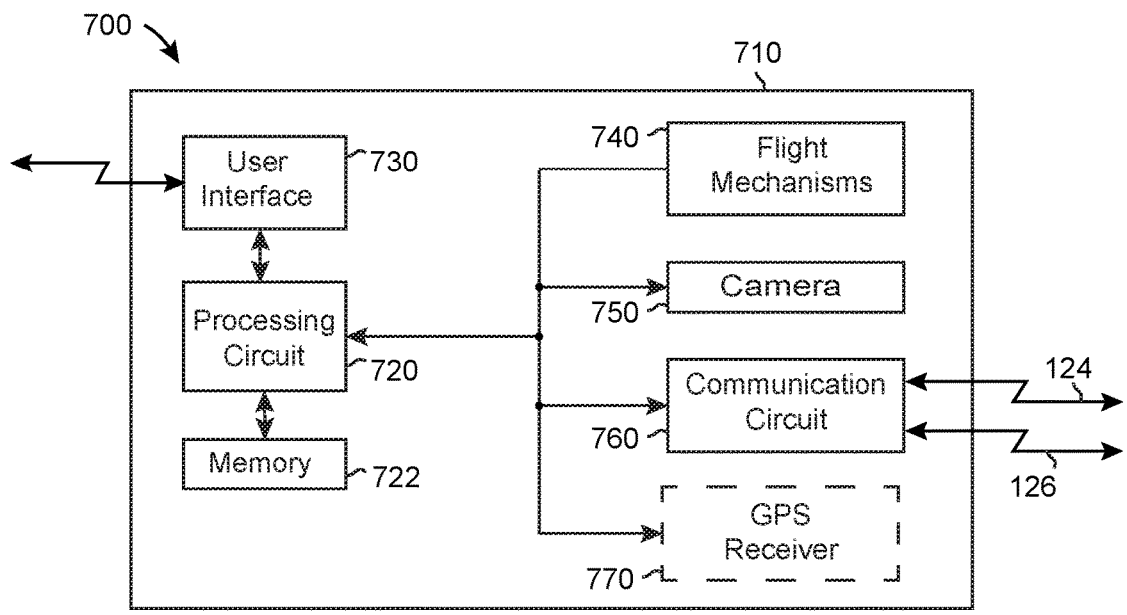
FIG. 7 is an implementation of a drone.

An implementation of a drone, drone 700, is shown in FIG. 7. Drone 700 includes housing 710, processing circuit 720, memory 722, user interface 730, flight mechanics 740, camera 750, and communication circuit 760. Drone 700 may optionally include global positioning ("GPS") receiver 770. Drone 700 and camera 750 perform the functions of a drone and a camera respectively as discussed above.

A housing provides structure for holding the components of a drone in position so they can cooperate to perform the functions of a drone. A house may be referred to as a frame (e.g., airframe). A housing may be formed of a rigid, light-weight material. A frame is formed of a material with sufficient strength to withstand the forces (e.g., torque, acceleration, movement, vibration) associated with a drone and flight. The components of a drone may be mounted to the housing.

A user interface includes any type of interface for a user to provide information to a drone and/or receive information from a drone. A user interface may include controls (e.g., buttons, switches, touch screen) for manual operation by a user to provide information to a drone. A user interface may include an on-off switch for applying power to or removing power from a drone. A user interface may include switches for selection of a mode of operation (e.g., track, observe, stealth) by a user. A user interface may include a touchscreen for providing (e.g., entering) information (e.g., user ID, altitude) into a drone. A user interface may include a display (e.g., LCD, touch screen) for providing information to a user.

For example, user interface 730 includes controls for manual operation by a user to provide information to drone 700. Processing circuit 720 receives the information entered by the user via user interface 730. Processing circuit 720 may perform an operation responsive to the information from user interface 730. Processing circuit 720 may store the information received from user interface 730. Processing circuit 720 may provide information to user interface 730 for display on a display of user interface 730. Processing circuit 720 may receive information from memory 722, communication circuit 760, camera 750, and/or GPS receiver 770 for sending to user interface 730 for presentation on a display of user interface 730. A processing circuit may perform a computation on data and provide the data to user interface 730 for presentation on the display of user interface 730.

A processing circuit may control, in whole or in part, the operations of a drone. A processing circuit may control the flight of a drone. A processing circuit may autonomously or partially autonomously control the flight of a drone. A processing circuit may control video data capture by a camera of the drone. A processing circuit may receive position data (e.g., three dimensional; x, y, z; latitude, longitude, altitude) from a GPS receiver. A processing circuit may use position data from a GPS receiver to control flight of the drone. A processing circuit may control communication (e.g., transmission, reception) of a communication circuit. A processing circuit may alone or in cooperation with a communication circuit measure a communication rate of the communication circuit. A processing circuit may determine whether a communication rate of a communication circuit is at or above a threshold. A processing circuit may cooperate with a camera and a communication circuit to transmit video data. A processing may receive instructions from a communication circuit for controlling the flight of the drone. A processing circuit may receive information from a communication circuit for identifying an object for tracking and/or observation.

A communication circuit may transmit and/or receive data (e.g., information). A communication circuit may transmit and/or receive (e.g., communicate) data via a wireless link. A communication circuit may perform short-range wireless communication and/or long-range wireless communication. Short-range wireless communication may have a transmission range of approximately 20 cm-100 meters. Communication protocols for short-range wireless communication may include Bluetooth, Zigbee, NFC, IrDA. Long-range wireless communication may have a transmission ranges up to 15 kilometers. Communication protocols for long-range wireless communication may include WiFi, GSM, GPRS, 3G, LTE, 5G. A communication circuit may communicate with a base station using long-range wireless communication.

A communication circuit may wirelessly communicate with a remote control operated by a user to provide operating, including flight, instructions to the drone. Communication protocols for wireless communication with a remote control may include PWM, PCM, CPPM, DSM, FrSky, FASST, FlySky, and/or a proprietary protocol.

A communication circuit may establish and/or maintain communication with a communication device of a user, a base station, and/or a remote control at a location where the drone is operating. A communication circuit may communicate by transmitting data and/or receiving data. A communication circuit may establish a wireless communication link for wireless communication using a wireless communication protocol. A communication circuit may establish and communicate via one or more wireless communication links (e.g., 124, 126). A communication circuit may communicate via two or more communication links at the same time. Each wireless communication link may operation in accordance with a different wireless communication protocol. A communication circuit may measure its rate of communication. A communication circuit may report its rate of communication.

A processing circuit may identify an object in an image. The image may be provided by a camera. A processing circuit may determine the number of pixels (e.g., resolution) used to represent an object in an image from a camera (e.g. object resolution). A processing circuit may determine whether the number of pixels used to represent an object in an image is greater than, equal to, or less than a threshold (surveillance resolution, observation resolution). A processing circuit may use information regarding an object in an image to track the object. A processing circuit may use information regarding an object in an image to observe the object. A processing circuit may control movement of a drone in accordance with whether the resolution of an object in an image is at or above a threshold. A processing circuit may control movements of a drone in accordance with the resolution of an object in an image and a rate of communicate. A processing circuit may control movements of a drone in accordance with the resolution of an object in an image and a rate of communicate in accordance with a mode of operation of the drone.

In an implementation, a processing circuit may include any circuitry and/or electrical/electronic subsystem for performing a function. A processor circuit may execute one or more stored programs. A processing circuit may include a digital signal processor, a microcontroller, a microprocessor, an application specific integrated circuit, a programmable logic device, logic circuitry, state machines, MEMS devices, signal conditioning circuitry, memory, data busses, and/or address busses. A processing circuit may include conventional passive electronic devices (e.g., resistors, capacitors, inductors) and/or active electronic devices (e.g., op amps, comparators, analog-to-digital converters, digital-to-analog converters, programmable logic). A processing circuit may include output ports, input ports, timers, embedded memory, and/or arithmetic units.

A processing circuit may provide and/or receive electrical signals whether digital and/or analog in form. A processing circuit may provide and/or receive digital data (e.g., information) via a bus using any protocol. A processing circuit may receive data, manipulate data, and provide the manipulated data. A processing circuit may store data and retrieve stored data. Data received, stored, and/or manipulated by a processing circuit may be used to perform a function.

A processing circuit may control the operation and/or function of other circuits and/or components of a system. A processing circuit may receive data from other circuits and/or components of a system. A processing circuit may receive status information regarding the operation of other components of a system. A processing circuit may provide commands (e.g., instructions, signals) to one or more other components responsive to data and/or status information. A command may instruct a component to start operation, continue operation, alter operation, suspend operation, and/or cease operation. Commands and/or status may be communicated between a processing circuit and other circuits and/or components via any type of buss.

A camera includes one or more sensors for detecting physical properties. Physical properties may include light and sound. A sensor of the camera detects light. A sensor may include a semiconductor device such as charged coupled device (e.g., CCD). An area of the sensor (e.g., array) may be described as having rows (e.g., height) and columns (e.g., width) of pixels. Each pixel detects light. The pixels capture light at a moment in time to form an image. An image includes rows and columns of pixels. The pixels may represent objects that were in the field of view when the image was captured. A sensor may provide pixel data (e.g., image data) as digital data. Digital image data may be presented, for example on a display. An image may be comprehensible to a human. The digital data of an image may be processed (e.g., calculated, manipulated, analyzed) by a processing circuit. A processing circuit may detect an object in the image captured by a sensor of a camera.

A camera may capture a single image (e.g., still) or a sequence of images (e.g., video data) at a rate (e.g., 30 frame-per-second). A camera that captures a sequence of images at a rate may be referred to herein as a video camera. One image of a sequence of images captured by a video camera may be described as a frame. A camera may capture images in color and/or in black and white. A camera may capture images in the visible light spectrum. A camera may capture images outside (e.g., infrared, ultra-violet, x-ray) the visible light spectrum.

A camera may include optics (e.g., lenses, filters). A camera may include one or more lenses. A lens of a camera may have a variable focal length. A focal length of the lens may be changed to captures images at different sizes. A focal length of the lens may be change to zoom into an area to capture images. A lens of a camera may have variable apertures. A processing circuit may control, in whole or part, the operation of the optics of a camera.

A camera may be mounted on a gimble that is mounted to a drone. A camera may be positioned by a gimble to capture image data in a particular direction. A gimble may include a gyroscope for stabilizing the camera against movement and/or vibration. A processing circuit may control, in whole or part, the operation of the gimble to position the camera.

A camera may perform image stabilization. A camera and/or lens may include an optical image stabilizer. A camera may perform real-time digital images stabilization.

A memory may store and/or retrieve data. A memory may store and/or retrieve digital data. A memory may store and/or retrieve image data captured by a camera. A memory may store and/or retrieve data that results from analysis of image data. A processing circuit may store data in a memory. A processing circuit may retrieve data from a memory. A memory may include non-volatile memory. Instructions for execution by a processing circuit may be stored in non-volatile memory. An implementation of a memory may include any semiconductor, magnetic, optical technology, or combination thereof.

Flight mechanisms include the structures and electronics required for a drone to fly and move. Flight mechanisms include a frame (e.g., housing), propellers, pusher propellers, motors (e.g., brushless electric), landing gear, a power supply, and an electronic speed controller. Flight mechanisms may include a processing circuit that controls and coordinates the operation of the flight mechanisms (e.g., flight controller) to cause the drone to fly, land, turn, hoover, or perform any other maneuver or operation related to flight. A processing circuit that controls other aspects (e.g., camera, communication) of the operation of the drone may perform the operations of a flight controller in whole or in part.

A global positioning ("GPS") receiver receives signals from four or more satellites. A GPS receiver uses the signals from the satellites to determine the geographic position (e.g., latitude, longitude; easting, northing) and altitude of the receivers. A GPS receiver may report the three-dimensional position (e.g., geographic position plus altitude). A processing circuit may use position data from a GPS receiver to navigate (e.g., position, maneuver) a drone. A processing circuit may record position data from a GPS receiver in a memory. A processing circuit may communicate position data via a communication circuit.

Housing 710, processing circuit 720, memory 722, communication circuit 760, camera 750, flight mechanisms 740 and GSP receiver 770 include the structure and perform the functions of a housing, a processing circuit, a memory, a communication circuit, a camera, flight mechanisms, and a GSP receiver respectively as discussed above.

The foregoing description discusses implementations (e.g., embodiments), which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments have been described, the scope of the invention is intended to be measured by the claims as set forth below. In the claims, the term "provided" is used to definitively identify an object that not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other word that refer to a location, whether specific or general, in the specification shall be construed to refer to any location in the specification whether the location is before or after the location indicator.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods.

What is claimed is:

1. A method performed by a drone for regulating an altitude of the drone, the method performed autonomously by the drone, the method comprising:
   detecting a mode of operation, the mode of operation includes a stealth mode and an observation mode;
   while in the observation mode:
      performing at least one of decreasing the altitude of the drone to move closer to an object and changing a zoom factor of a camera until a resolution of the object in an image captured by the camera is equal to or greater than an observation resolution; and transmitting wirelessly to a server a video data captured by the camera at a rate of wireless communication that is equal to or greater than a threshold;

while in the stealth mode:

increasing the altitude of the drone to move away from the object;

adjusting the zoom factor of the camera until the resolution of the object in the image is about a surveillance resolution; and transmitting wirelessly to the server the video data captured by the camera at the rate of wireless communication; wherein:

the camera is coupled to the drone; and the observation resolution is greater than the surveillance resolution.

2. The method of claim 1 wherein the observation resolution is thirty-five percent of a total number of pixels of the image captured by the camera.

3. The method of claim 1 wherein the surveillance resolution is one percent of a total number of pixels of the image captured by the camera.

4. The method of claim 1 wherein while the resolution of the object is at least the surveillance resolution, the drone identifies the object in the image captured by the camera.

5. The method of claim 1 wherein while the resolution of the object is at least the surveillance resolution, the drone tracks the object.

6. The method of claim 1 wherein while the resolution of the object is equal to or greater than the observation resolution, the image of the object includes visual details of the object for identifying the object.

7. The method of claim 1 wherein:

the object is a human; and the observation resolution includes visual details of the human.

8. The method of claim 1 wherein the threshold for the rate of wireless communication is sufficient to support live-streaming of the video data captured by the camera.

9. The method of claim 1 further comprising while in the stealth mode, and the rate of wireless communication at all altitudes is less than the threshold:

changing at least one of the altitude of the drone and the zoom factor of the camera until the resolution of the object captured by the camera is about equal to the surveillance resolution; and recording the video data captured by the camera.

10. The method of claim 1 further comprising while in the observation mode, and the rate of wireless communication at all altitudes is less than the threshold:

changing at least one of the altitude of the drone and the zoom factor of the camera until the resolution of the object captured by the camera is equal to or greater than the observation resolution; and recording the video data captured by the camera.

11. The method of claim 1 wherein while in one of the stealth mode and the observation mode, transmitting the video data comprises transmitting a live-stream of the video data captured by the camera to the server.

12. The method of claim 1 further comprising while in one of the stealth mode and the observation mode, tracking a movement of the object.

13. The method of claim 1 wherein:

the mode of operation further comprises a tracking mode; and the method further comprises:

while in the tracking mode:

changing at least one of the altitude of the drone and the zoom factor of the camera until the resolution of the object in the image is equal to or greater than the surveillance resolution; and transmitting wirelessly to the server the video data captured by the camera at the rate of wireless communication.

14. A system for regulating an altitude of a drone, the system comprising:

a processing circuit, the processing circuit positioned on the drone, the processing circuit controls a flight of the drone;

a communication circuit, the communication circuit communicates with a server via a wireless communication link, the communication circuit positioned on the drone;

a camera, the camera captures an image, the image includes a plurality of pixels, the camera positioned on the drone; wherein:

the processing circuit detects a mode of operation, the mode of operation includes a stealth mode and an observation mode;

while in the observation mode, the system:

performs at least one of decreases the altitude of the drone to move closer to an object and changes a zoom factor of the camera until a resolution of the object in the image is equal to or greater than an observation resolution; and transmits wirelessly to the server a video data captured by the camera at a rate of wireless communication that is equal to or greater than a threshold;

while in the stealth mode, the system:

increases the altitude of the drone to move away from the object;

adjusts the zoom factor of the camera until the resolution of the object in the image is about a surveillance resolution; and transmits to the server the video data captured by the camera at the rate of wireless communication; and the observation resolution is greater than the surveillance resolution.

15. The system of claim 14 wherein the observation resolution is thirty-five percent of the plurality of pixels.

16. The system of claim 14 wherein the surveillance resolution is about one percent of the plurality of pixels.

17. The system of claim 14 further comprising while in the stealth mode, if the rate of wireless communication at all altitudes is less than the threshold, the system:

changes at least one of the altitude of the drone and the zoom factor of the camera until the resolution of the object in the image is about equal to the surveillance resolution; and records the video data captured by the camera.

18. The system of claim 14 further comprising while in the observation mode, if the rate of wireless communication at all altitudes is less than the threshold, the system:

changes at least one of the altitude of the drone and the zoom factor of the camera until the resolution of the object captured by the camera is equal to or greater than the observation resolution; and records the video data captured by the camera.

19. The system of claim 14 further comprising while in the stealth mode or in the observation mode, the system tracks a movement of the object.

20. The system of claim 14 wherein:
the mode of operation further comprises a tracking mode;
while in the tracking mode, the system:
    changes at least one of the altitude of the drone and the zoom factor of the camera until the resolution of the object in the image is equal to or greater than the surveillance resolution; and
    transmits wirelessly to the server the video data captured by the camera at the rate of wireless communication.

* * * * *